Aug. 2, 1949.　　　H. KERSHAW ET AL　　　2,477,880
SAW SHARPENING MACHINE

Filed June 29, 1945　　　　　　　　　7 Sheets-Sheet 1

Inventors
Henry Kershaw
Albert F. Pityo
Harry Butterfield
By
Attorney

Aug. 2, 1949.  H. KERSHAW ET AL  2,477,880
SAW SHARPENING MACHINE
Filed June 29, 1945  7 Sheets-Sheet 4

Inventors
Henry Kershaw
Albert F. Pityo
Harry Butterfield
By
Attorney Aug. 2, 1949.   H. KERSHAW ET AL   2,477,880
SAW SHARPENING MACHINE

Filed June 29, 1945   7 Sheets-Sheet 5

Inventors
Henry Kershaw.
Albert F. Pityo.
Harry Butterfield.
By
Attorney

Aug. 2, 1949.  H. KERSHAW ET AL  2,477,880
SAW SHARPENING MACHINE
Filed June 29, 1945  7 Sheets-Sheet 7

Patented Aug. 2, 1949

2,477,880

UNITED STATES PATENT OFFICE 2,477,880

SAW SHARPENING MACHINE

Henry Kershaw, Belleville, Albert F. Pityo, Clifton, and Harry Butterfield, Maplewood, N. J., assignors, by mesne assignments, of one-half to said Henry Kershaw, one-fourth to said Albert F. Pityo, and one-fourth to said Harry Butterfield Application June 29, 1945, Serial No. 602,180

17 Claims. (Cl. 76—40)

Our invention relates to a machine for sharpening saws.

An important object of the invention is to provide a machine which will sharpen various types of saws, such as hack saws, wood saws, band saws or circular saws.

A further object of the invention is to provide a machine of the above mentioned character which is adjustable for cutting the desired rake on the saw tooth.

A further object of the invention is to provide a machine of the above mentioned character which will cut the desired set or transverse angle on the saw teeth.

A further object of the invention is to provide a machine of the above mentioned character which is adjustable to regulate the throw of the rotary cutter or grinding wheel to compensate for the variance in size of the saw teeth to be ground, as well as to compensate for the change in diameter of the rotary cutter or grinding wheel, due to wear upon the same, or the use of rotary grinding wheels of different diameters.

A further object of the invention is to provide means to feed the saw longitudinally by engaging the teeth of the saw.

A further object of the invention is to provide saw feeding means of the above mentioned character which can be accurately adjusted to properly feed saws having teeth of different longitudinal length.

A further object of the invention is to provide means for effecting a step by step feed of the saw and at the same time positively holding the saw against backward movement.

A further object of the invention is to provide a machine of the above mentioned character which is in the nature of an attachment to be mounted upon the table of a drill, and driven by the spindle of the drill, whereby the different speeds of the spindle may be utilized to drive the rotary cutter or grinding wheel and compensate for the change in diameter of the cutter or grinding wheel, due to wear or the like.

A further object of the invention is to provide means for covering the rotary cutter or grinding wheel, thus reducing liability of accidents.

A further object of the invention is to provide a machine of the above mentioned character which is relatively simple in construction and automatic in operation.

Other objects and advantages of the invention will be apparent during the course of the following description.

In the accompanying drawings, forming a part of this application, and in which like numerals are employed to designate like parts throughout the same.

In the drawings, wherein for the purpose of illustration is shown a preferred embodiment of our invention, the numeral 10 designates a drill as a whole, comprising a vertical post 11, carrying a table 12. Mounted upon the top of the post 10 is a vertical spindle 13, carrying a chuck 14. The spindle 13 is driven by a motor 15 through the medium of variable speed gearing 16. The present invention, for the purpose of illustration, will be described as applied to this drill, but the invention may be applied to any other suitable form of drill. It may be used without the drill, and driven by any suitable means.

It is preferred that our grinder be made in the nature of an attachment to be used with the drill, for convenience in clamping the same in place and for driving the same. Our grinding machine includes a housing 17, having a top 18 which is cut away at 19 for providing an opening or passage 20, which extends to the longitudinal edge of the top 18, as shown. This passage receives a rotary grinder, to be described. The top also includes a vertical inclined top portion 21, which leads to the passage 20 and extends upwardly toward this passage. The housing 17 is provided at its bottom with horizontal flanges 22, having openings 23, for receiving bolts 24 extending through slots 25 in the table 12, and serving to clamp the housing 17 to the table 12.

The top 17 of the housing has a vertical bearing 26, receiving a vertical shaft 27, also journalled at its lower end in a fixed bearing 28. The shaft 27 cannot move longitudinally with relation to the housing 17 and carries a stop ring 29, clamped thereto, and engaging the top of the bearing 26. The upward movement of the shaft is prevented by a horizontal bevel gear 30, rigidly mounted upon this shaft and engaging a bearing element or washer 31', in turn engaging the lower end of the vertical bearing 26. The upper end of the shaft 27 is inserted into the chuck 14 and is therefore driven by the spindle 13. The horizontal bevel gear 30 engages a vertical bevel gear 31, arranged beneath it, and this bevel gear 31 is rigidly mounted upon a horizontal longitudinal shaft 32, journalled in fixed bearings 33 and 34.

The numeral 35 designates a transverse vertical swinging support or carriage, provided at one end with a sleeve 36, pivoted upon the shaft 32, and held against longitudinal movement by the bearings 33 and 34. At its free end, the carriage 35 has a long sleeve or bearing 37, receiving a horizontal rotatable shaft or spindle 38. The shaft or spindle 38 has a rotary cutter or grinding wheel 39, suitably mounted thereon, in concentric relation thereto, near one end, and the shaft or spindle 38 extends for a short distance beyond this cutter or grinding wheel. A stop ring 40 is suitably clamped upon the opposite end of the shaft or spindle 38, and a spacing ring 41 is arranged between the cutter or grinding wheel 39 and the opposite end of the sleeve or bearing 37. The shaft or spindle 38 cannot move longitudinally with respect to the sleeve or bearing 37 but is rotatable therein. The shaft or spindle 38 remains horizontal at all times and the cutter or grinding wheel 39 remains perpendicular or vertical at all times and extends transversely of the axis of rotation of the shaft 38 and at a right angle to this axis of rotation. The cutter or grinding wheel 39 is circular and has flat parallel faces 42 and 43, perpendicular to the axis of rotation of the shaft or spindle 38. The cutter or grinding wheel has a periphery 44 which is beveled or inclined, corresponding to the shape of the saw teeth to be ground.

Disposed upon the outer side of the cutter or grinding wheel 39 is a pulley 45, rigidly mounted upon the end of the shaft 38, and removable from this shaft. This pulley is driven by a belt 46, engaging a larger pulley 47, in turn rigidly mounted upon the shaft 32. The support or carriage 35 is concentrically pivoted with respect to the pulley 47.

Rigidly mounted upon the vertical shaft 27, beneath the horizontal bevel gear 30, is a worm 48, disposed to engage a worm wheel 49, which is rigidly mounted upon a horizontal longitudinal shaft 50, journalled in fixed bearings 51 and 52. The shaft 50 is parallel with the shaft 32.

Rigidly mounted upon the shaft 50 is a cam 53, having a high point 54, arranged to engage a rounded head 55, carried by the lower end of an adjustable screw 56, having screw threaded engagement within an opening 57, formed in the support or carriage 35. This adjustable screw 56 is locked in position by a lock nut 58. The purpose of the adjustable screw 56 is to regulate the vertical effective grinding movement of the cutter or grinding wheel 39. When the adjustable screw 56 is screwed downwardly with relation to the support or carriage 35, the support or carriage will have a higher starting point and also a higher stopping point. With the diameter of the cutter or grinding wheel 39 being constant, the affected grinding action of the grinding wheel can therefore be adjusted, to compensate for the depth of the saw tooth to be ground. The screw 56 is also adjusted to compensate for the change in diameter of the cutter or grinding wheel, as it wears down, or to compensate for the use of grinding wheels of different diameters. The cutter or grinding wheel 39 must be dressed at intervals, for maintaining the proper bevel of the periphery 44, and this reduces the diameter of the grinding wheel, which is compensated for by adjusting the screw 56, as explained. The support or carriage 35 is moved downwardly by a spring 59, engaging the top of the carriage and a disc 60, engaging an adjustable screw 61, having screw threaded engagement within an opening formed in the top 18. The tension of the spring 59 may be regulated, and this spring moves the support or carriage 35 downwardly and causes the head 55 to closely follow the cam 53.

The numeral 62 designates a horizontally angularly adjustable bracket, including a horizontal base 63 and a vertical web 64. The horizontal base has circularly curved slots 66, and the web 64 has circularly curved slots 65. The slots 66 receive bolts 67, which are tapped into the top 18. A saw holding and guiding device 68 is provided, comprising vertical or upstanding plates 69 and 70, having their inner faces contacting, as shown. The curved slots 65 receive bolts 71, which are tapped into the plate 69. The assembled plates 69 and 70 may therefore be turned with respect to the vertical web 64 for angularly adjusting the assembled plates 69 and 70. The plate 70 is provided with openings 72 for receiving centering pins 73, for insertion within openings 74, formed in the plate 69. The plate 70 is provided near its upper end with openings 75 for receiving set screws 76 for screw threaded engagement within openings 77 formed in the plate 69. The set screws 76 serve to clamp the plate 70 to the plate 69. At their bottoms, the plates 69 and 70 have axial extensions or lugs 75', having openings 76', for receiving centering pins 77', passing through openings 78 in a spacer 79, and openings 80 in a generally horizontal support-plate 81. The extensions or lugs 75' have openings 82, for receiving bolts 83, passing through openings 84 formed in the spacer 79 and having screw threaded engagement within openings 85, formed in the support-plate 81. A forward support-plate 86 is arranged beneath the bottoms of the plates 69 and 70, adjacent to their forward ends, and are secured to the plates 69 and 70 by screws 87, as shown.

Mounted upon the support-plate 81 is a circular pawl controlling or covering disc 88, eccentrically pivoted upon the support-plate 81 at 89. The upper face of this pawl controlling or covering disc is flat, while its lower face is beveled adjacent to its periphery, as shown at 90. The upper face of the disc 88 is at the elevation of the upper face of the support-plate 86. The disc 88 and the support-plate 81 are spaced from the forward support-plate 86, providing a passage 91, which leads to notches 92, formed in the plates 69 and 70. The upstanding plate 70 is provided upon its inner face with a recess 93, the side wall of which is perpendicular to the horizontal. This recess extends from a shoulder 94 and passes through the bottom of the upstanding plate 70. At its longitudinal center, the upstanding plate 70 is provided with a vertical recess 95, receiving a guide plate or element 96, having a notch 97' at its lower end, to register with the notches 92. The guide plate 96 is vertically adjustable and is clamped in the selected adjusted position by set screws 97, tapped into the upstanding plate 70. It is thus seen that the upstanding plates 69 and 70 and associated elements constitute means for holding and guiding a saw 98, which may be a hack saw. This saw is arranged on edge within the recess 93 and its teeth rest upon the disc 88 and front support-plate 86. The saw 98 is thinner than the recess 93.

Means are provided to effect a step by step longitudinal feed of the saw 98. This means comprises a sleeve 99, pivoted upon a horizontal transverse stud 100, anchored to the bearing 33. This sleeve carries a generally horizontal arm 101, arranged above and in engagement with a cam 102, having a high point 103. This cam is rigidly mounted upon the shaft 50. The sleeve 99 is provided with an upstanding arm 104, having a horizontal extension 105 at its upper end, and a pawl 106 is pivotally mounted upon this horizontal extension, at 107. The pawl 106 faces upwardly and is urged upwardly by a spring 108, mounted upon an extension 109 carried by the arm 104. The arm 104 is swung in one direction to cause the arm 101 to closely follow the cam 102, by a rectangular coil spring 110. The pawl 106 is arranged to successively engage the teeth of the saw 98, passing into the space 91, for this purpose. The pawl 106 is arranged beneath the disc 88 and this disc regulates the effective action of the pawl, upon each stroke, so that it will feed the saw each step, throughout the entire length of the tooth of the saw, depending upon the particular length of such tooth. When the pawl 106 moves forwardly it is beneath the disc 88 and is covered thereby and as it approaches the end of its forward stroke, it rides off of the beveled face 90 of the disc 88 and rises to engage with the selected tooth of the saw, and completes its forward stroke while engaging such tooth, and thus feeds the saw a step corresponding to the length of the tooth. The entire stroke of the pawl is greater than the length of the saw tooth, and the disc 88 retains the pawl 106 depressed and out of engagement with the saw tooth, during the first portion of the pawl stroke, but releases the pawl for engagement with the saw tooth, for the remainder of the pawl stroke. By turning the disc 88 upon its eccentric pivot 89, the pawl will ride off of the disc at different points in its forward stroke, whereby the effective feeding movement of the pawl while engaging the saw tooth may be regulated, corresponding to the length of the saw tooth. The disc 88 is provided with a scale 111 for coaction with a fixed pointer 112, to indicate the extent of adjustment of the disc 88.

Means are provided to prevent the back feed of the saw 98 and to hold the saw in engagement with the face of the recess 93, comprising a saw clamp 113, projecting through the notch 92 of the plate 69, and pivoted by a pin 114 upon an arm 115, carried by the upstanding plate 69. The saw-engaging end of the clamp 113 is preferably rounded and the clamp 113 is swung inwardly toward the clamping position by a plunger 116, slideable within a cylindrical opening 117 formed in the upstanding plate 69. This plunger is urged inwardly by a compressible coil spring 118, held in place by a screw threaded plug 119, clamped in position by a set screw 120. The clamp 113 permits of the forward movement of the saw 98 but positively checks its rearward movement. The clamp 113 and arm 115 also extend through a vertical opening or notch 115' formed in the vertical web 64 and this notch 115' is sufficiently large to permit of the movement of the elements 113 and 115 therein, when the plate 69 is vertically angularly adjusted with respect to the vertical web 64.

The grinding wheel 39 must be dressed or sharpened at intervals and for this purpose we provide an anvil 121, attached to the housing 17. This anvil serves to support or guide the wheel dressing tool. The anvil is covered by a housing or guard 123, pivoted to the housing 17 to swing horizontally, as shown at 124. This housing also covers a part of the grinding wheel. The bracket 62 also has a recess 125 for receiving a portion of the disc 88.

The horizontal circularly curved slots 66 are concentric with the plane of the face 42 and the vertical circularly curved slots 65 are also concentric with the plane of this face 42.

Figures 4, 5, 6, 7:
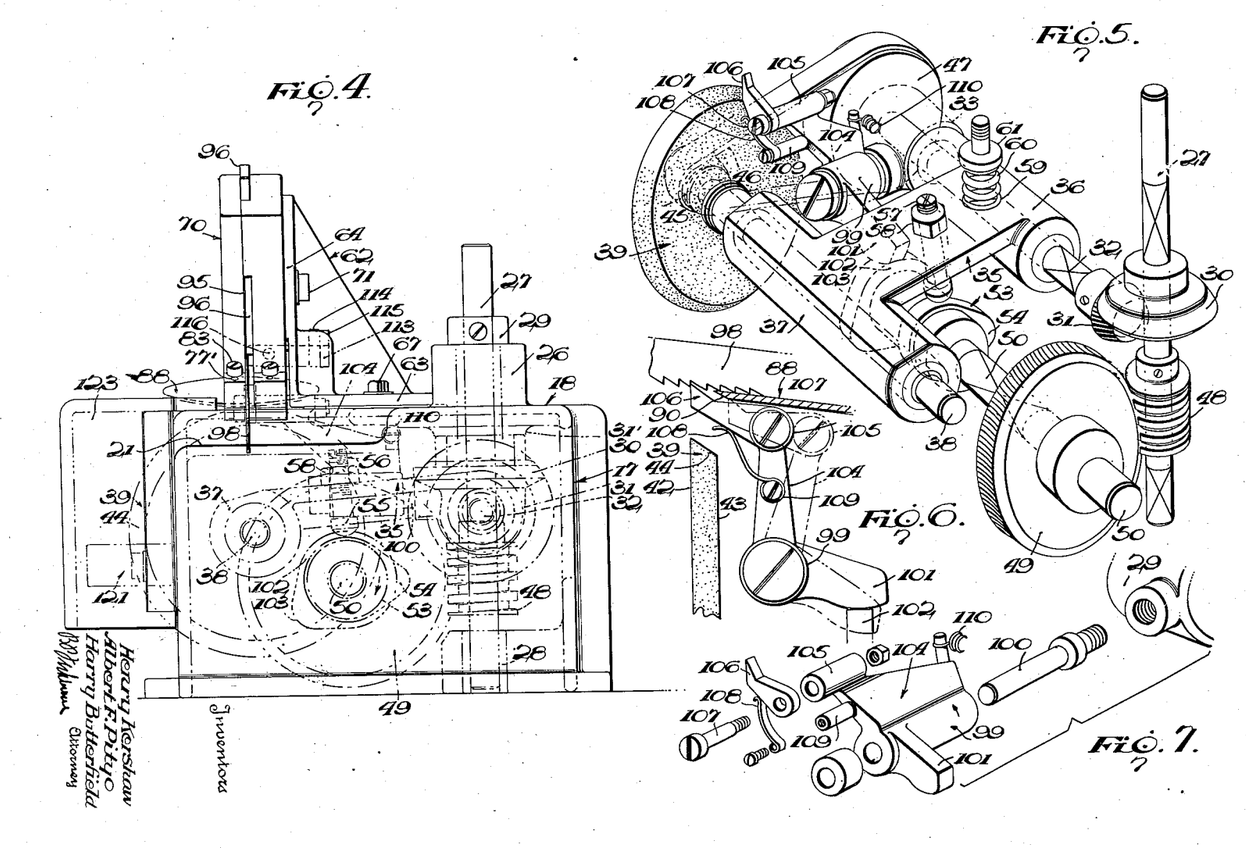
Figure 4 is an end elevation of the same.
Figure 5 is a perspective view of the driving means and associated elements separated from the casing.
Figure 6 is a side elevation of the saw feeding pawl.
Figure 7 is an exploded perspective view of the pawl and associated elements.
Figure 8:
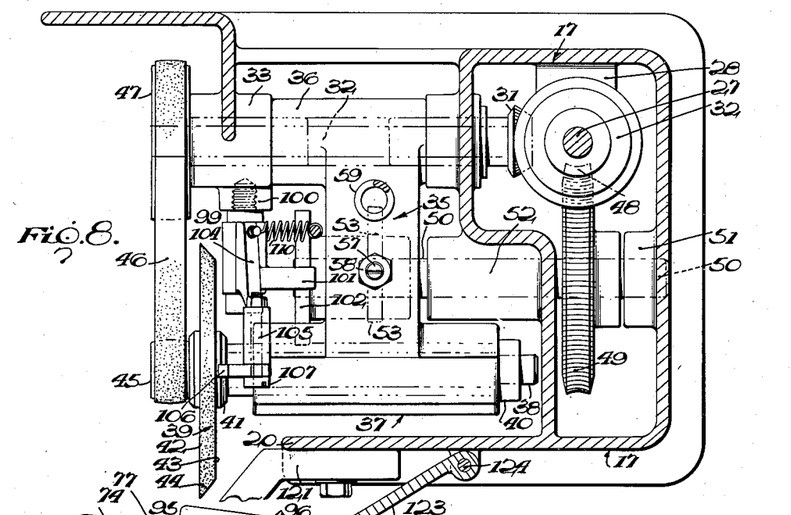
Figure 8 is a horizontal section taken on line 8—8 of Figure 3.
Figure 9:
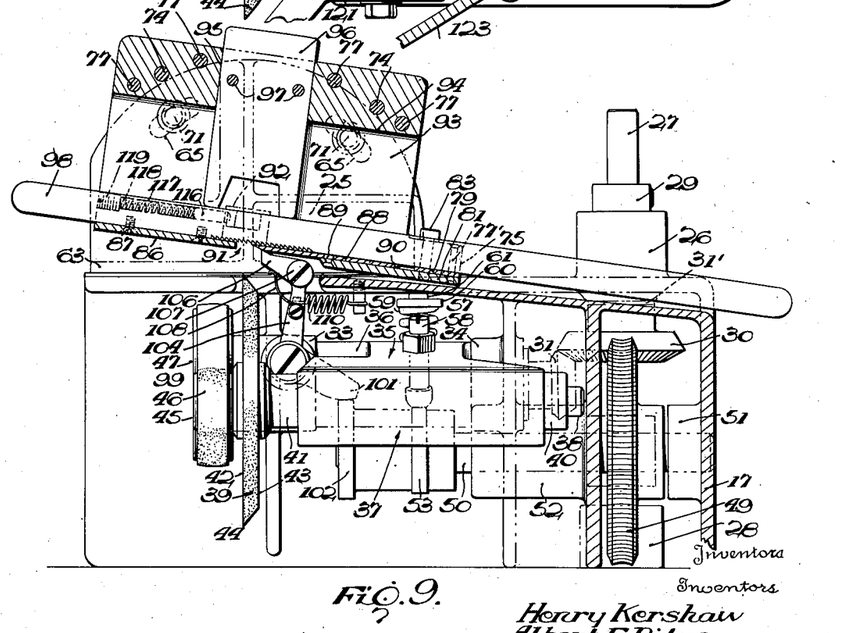
Figure 9 is a vertical longitudinal section taken on line 9—9 of Figure 2.
Figure 10:
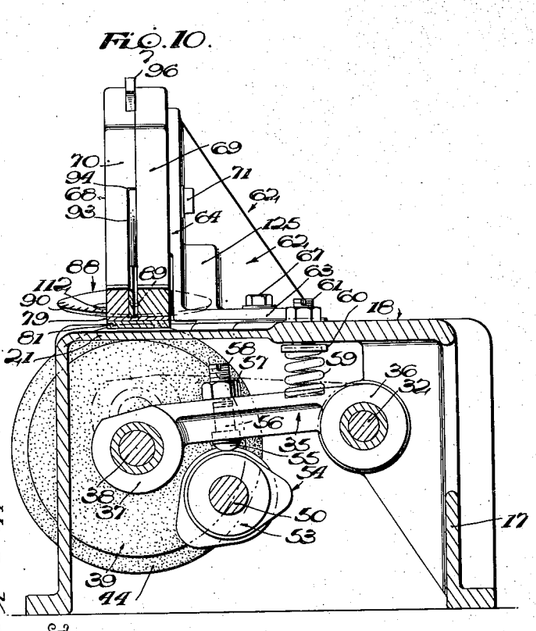
Figure 10 is a transverse vertical section taken on line 10—10 of Figure 3.
Figure 11:
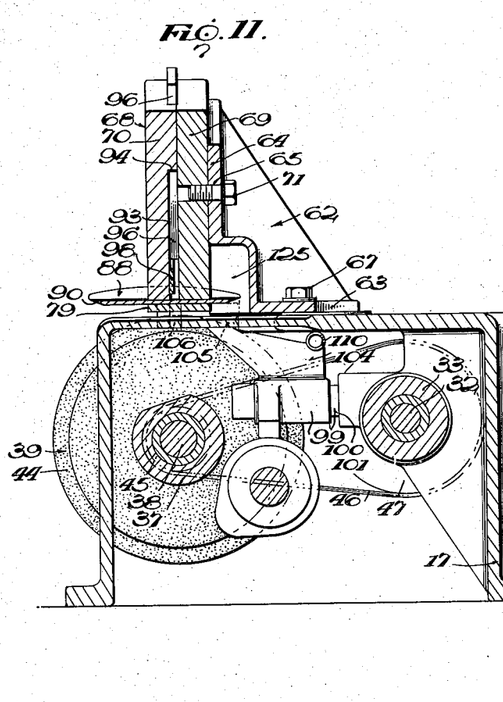
Figure 11 is a similar view taken on line 11—11 of Figure 3.

The operation of the machine is as follows:

The hack saw 98 is inserted within the recess 93, upon edge, with its teeth resting upon the disc 88 and front support plate 86. The guide or holding plate 96 is moved downwardly into proper engagement with the upper edge of the saw 98 and is then clamped in the adjusted position. The saw is longitudinally adjusted so that its leading tooth is at the passage 91 to be engaged by the grinding wheel, when it rises. If the upstanding plates 69 and 70 are perpendicular and parallel with the axis of rotation of the grinding wheel 39, then the face 42 of the grinding wheel, will cut the wall 126 of the tooth 127 at a right angle to the face of the tooth and will cut the wall 128 of the next trailing tooth 127 at a right angle to the face of the tooth, and will also cut the wall 128 longitudinally at the angle of the periphery 44 of the grinder, Figure 25. When it is desired to provide the walls 126 and 128 with a transverse set or bevel, Figure 24, the saw 98 is horizontally angularly adjusted with respect to the axis of rotation of the grinding wheel 39, Figure 22. This is effected by loosening the bolts 67 and turning the bracket 62 horizontally to the proper angular position and then locking the same in this position. When it is desired to change the angle of the wall 126, to produce a rake, the saw is angularly adjusted in a vertical plane, Figure 23, and this will cause the wall 126 to be cut along the line 129, Figure 28, producing the rake. The wall 128 is cut by the periphery 44 of the grinding wheel. The saw 98 may be horizontally angularly adjusted independently of the vertical angular adjustment or vice versa. The saw 98 is at rest during the grinding period. The shaft 27 is rotating and this rotation is imparted to the bevel gear 30, driving bevel gear 31, rotating shaft 32, which rotates shaft or spindle 38 through the medium of the gearing, including the belt 46. The grinding wheel 39 is continuously rotating. The shaft 27 also rotates worm 48, rotating worm wheel 49, which rotates shaft 50. The cam 53 rotates and its high point 54 engages the head 55, which swings the carriage or support 35 upwardly, elevating the grinding wheel 39 into engagement with the walls 126 and 128 of the leading tooth and next trailing tooth. The high point 54 then passes from beneath the head 55 and the carriage 35 descends to the lowered position and this downward movement is limited by the head 55 engaging the circularly curved portion of the cam 53. The high point 54 of the cam 53 leads the high point 103 of the cam 102 and the high point 54 will raise and lower the carriage 35 before the high point 103 actuates the pawl. The pawl is now in the rear or contracted position beneath the disc 88, Figure 6. When the high point 103 of the cam 102 engages the arm 101, the sleeve 99 is turned forwardly and the arm 104 swung forwardly while the spring 108 is pressing the pawl 106 upwardly. The pawl is moved forwardly and rises during this forward movement and engages the wall 126 of the tooth 127 and then moves the saw a step for a distance equal to the horizontal length of the tooth. When the high point 103 passes beyond the arm 101, the sleeve 99 is turned in the opposite direction and the arm 104 swings rearwardly and the pawl 106 moves rearwardly and is lowered by the beveled face 90 and is again covered by the disc 88. Each tooth is ground or sharpened, and the saw fed a step, so that the successive tooth is ground or sharpened, and the cycle of operation is automatically repeated. After the sharpening of the saw is completed, it may be readily withdrawn by a forward movement.

Figure 16:
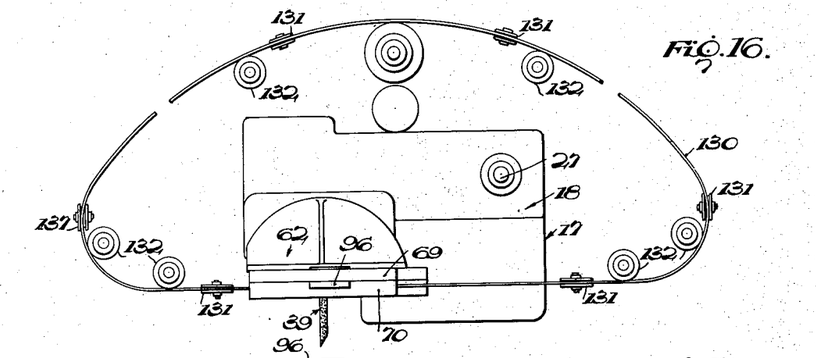
Figure 16 is a plan view, partly diagrammatic, of the saw sharpening machine, showing the same sharpening a band saw.

The machine can also be used for sharpening band saws. In Figure 16, we have shown such an arrangement. The numeral 130 designates a band saw, which is arranged generally horizontally on edge with its teeth resting upon grooved vertical wheels 131, carried by suitable supports. The band saw also passes about horizontal wheels 132, which are suitably supported. When the band saw is to be sharpened, the bracket 62 is removed from the top 18 and the support-plates 81 and 86 are separated from the upstanding plates 69 and 70. A portion of the band saw is then passed upwardly and forwardly into the recess 93. The support-plates 81 and 86 are again attached to the upstanding plates 69 and 70. The bracket 62 is again applied to the top 18. All other parts of the apparatus remain identical with those shown and described in connection with the first form of the invention. The machine is operated in the identical manner as described in connection with the sharpening of the blade 98. When the plates 69 and 70 are angularly adjusted, as described in connection with the first form of the invention, the wheels 131 and 132 will have to be adjusted accordingly, and these wheels will be supported by means which permits this.

Figure 12:
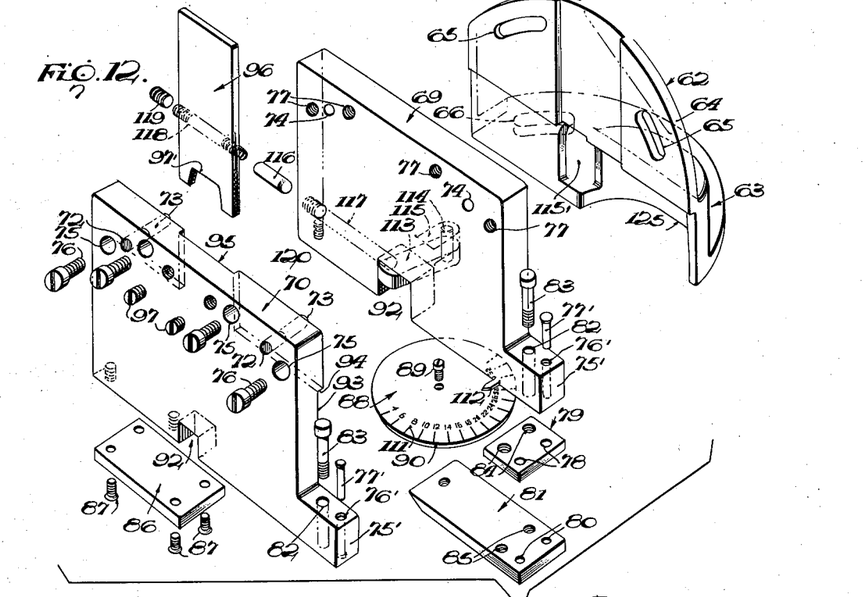
Figure 12 is an exploded perspective view of the saw holding and guiding means.
Figure 13:
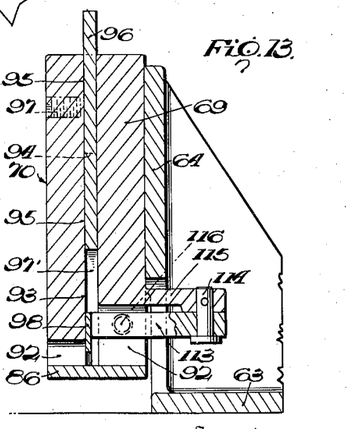
Figure 13 is a transverse section taken on line 13—13 of Figure 2.
Figure 14:
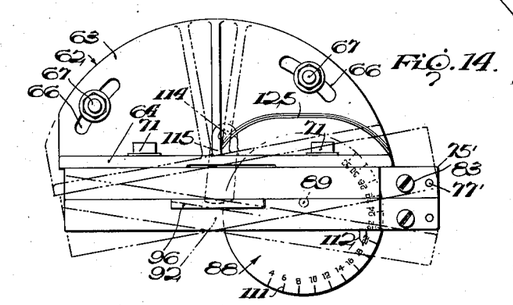
Figure 14 is a plan view, partly diagrammatic, of the saw holding and guiding means, illustrating the horizontal adjustment of the same.
Figure 15:
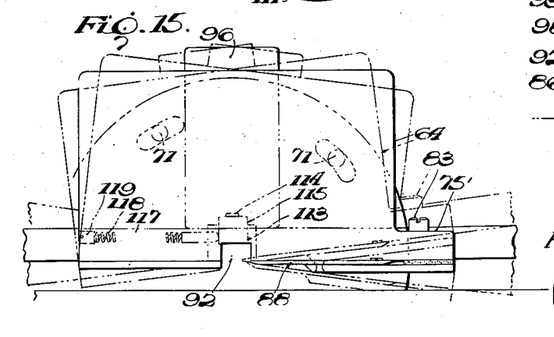
Figure 15 is a side elevation, partly diagrammatic, of the saw holding and guiding means, illustrating the vertical adjustment of the same.
Figures 17, 18, 19, 20, 21:
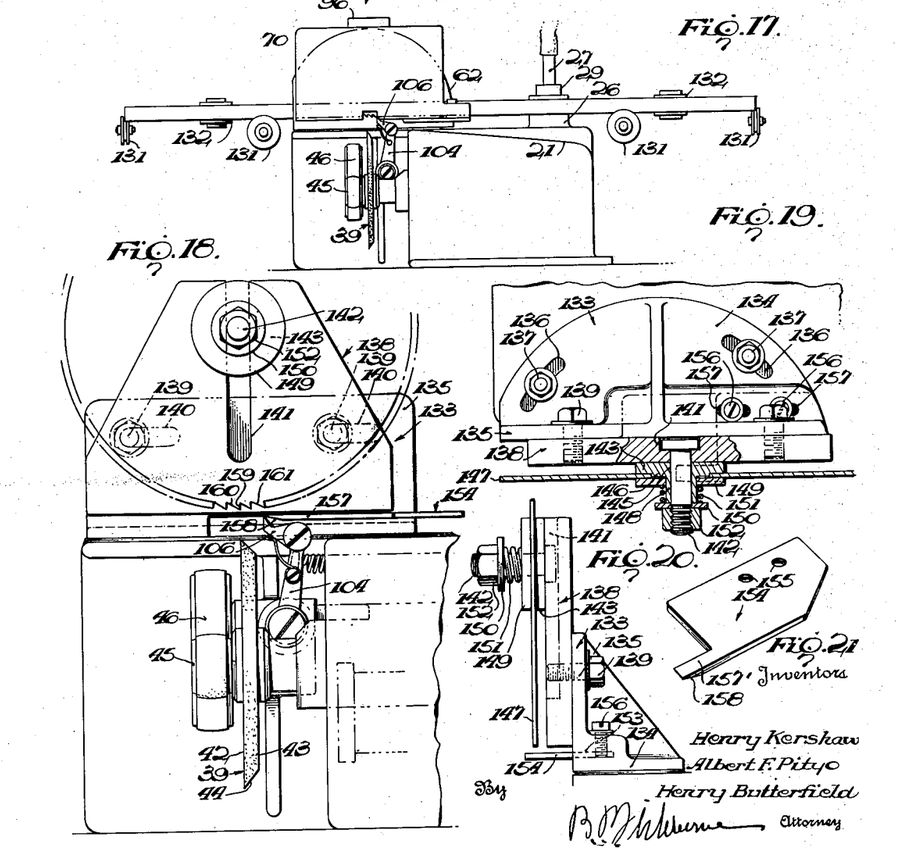
Figure 17 is a side elevation of the same.
Figure 18 is a side elevation of a modified form of the invention, showing a machine for sharpening a circular saw.
Figure 19 is a plan view of the same, parts in horizontal section.
Figure 20 is an end elevation of the same.
Figure 21 is a perspective view of the pawl covering plate.

The machine, with slight modification, can be used to sharpen or grind circular saws. This form of the invention is shown in Figures 18 to 21, inclusive. In this modification, the upstanding plates 69 and 70 and elements carried thereby and the bracket 62 are omitted. In Figures 18 to 20 inclusive, the numeral 133 designates a bracket, having a horizontal base 134 and a vertical web 135. The base 134 has circularly curved slots 136, corresponding to the slots 66, Figure 12. The slots 136 receive bolts 137, which are tapped into the top 18. The bracket 133 is therefore horizontally angularly adjustable. A vertical or upstanding plate 138 is arranged upon the outer face of the web 135 and is secured thereto by two bolts 139, extending through horizontal slots 140 formed in the plate 135 and tapped into the upstanding plate 138. The plate 138 is horizontally adjustable with respect to the grinding wheel 39.

The vertical plate 138 is provided with a vertical T-slot 141, extending through the top of the plate 138, for receiving the headed end of a stud 142. Mounted upon the stud 142 is an adaptor 143, having an opening 145 to receive the stud and having a reduced circular extension 146 to enter the opening of a circular saw 147. The extension 146 is slightly thinner than the saw 147. A sleeve 148 is preferably formed integral with the adaptor 143. The numeral 149 designates an inner washer and 150 an outer washer, and a spring 151 is arranged between these washers. The nut 152 has screw threaded engagement with the outer end of the stud 142. By screwing up the nut 152, the stud is clamped against the plate 138 so that it cannot be accidentally displaced and the spring 151 compressed so that the inner washer 149 is yieldingly clamped against the face of the circular saw 147. This produces sufficient frictional engagement to prevent improper turning movement of the saw, but permits the saw to be fed in a step by step manner. The bracket 133 is provided adjacent to the base 134 with a horizontal groove 153, to receive a pawl controlling or covering plate 154, having screw threaded openings 155 to receive bolts 156, operating within elongated slots 157, formed in the base 134. This plate is therefore horizontally adjustable. The plate 154 has an extension 157', the lower face of which is beveled at 158. The extension 157' extends over the pawl 106, to regulate its action, as explained in connection with the disc 88. All other parts of the apparatus remain identical with those shown and described in connection with the first form of the invention.

Figures 1, 22, 23, 24, 25, 26, 27, 28:
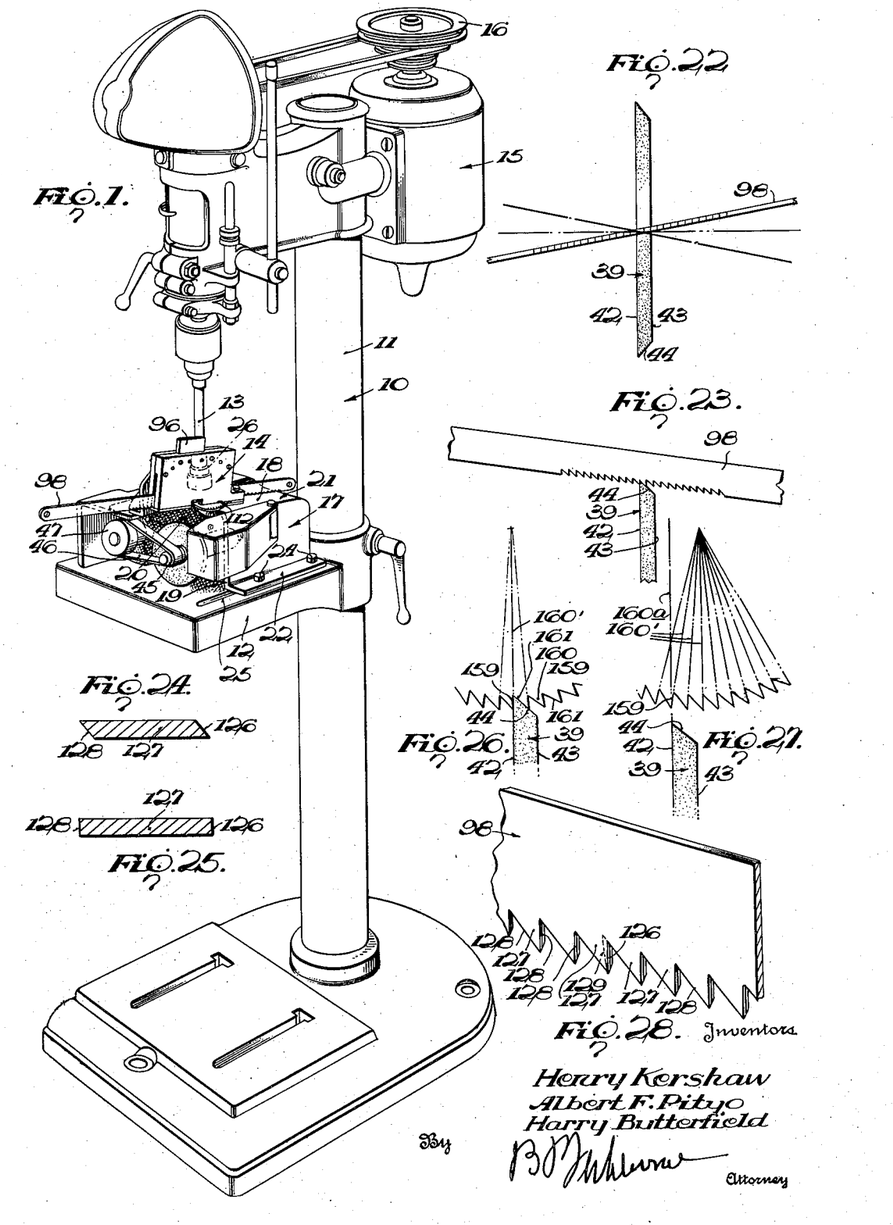
Figure 1 is a perspective view of a saw sharpening machine embodying our invention, showing the same applied to a drill press.
Figure 22 is a plan view of the grinding wheel and saw, illustrating the horizontal angular adjustment of the saw blade.
Figure 23 is a side elevation of a grinding wheel illustrating the vertical adjustment of the saw blade.
Figure 24 is a horizontal transverse section through one of the teeth, showing the edges of the tooth cut at an incline.
Figure 25 is a similar view through the edges of the tooth cut at a right angle.
Figure 26 is a diagrammatic view showing the grinding action when the radial wall of the tooth is held perpendicular and in alignment with the grinding end of the grinding wheel.
Figure 27 is a similar view showing the saw shifted so that its center is to one side of the grinding end of the grinding wheel and the radial wall of the tooth is inclined with respect to the perpendicular.
Figure 28 is an enlarged fragmentary perspective view of the saw.
Figure 2:
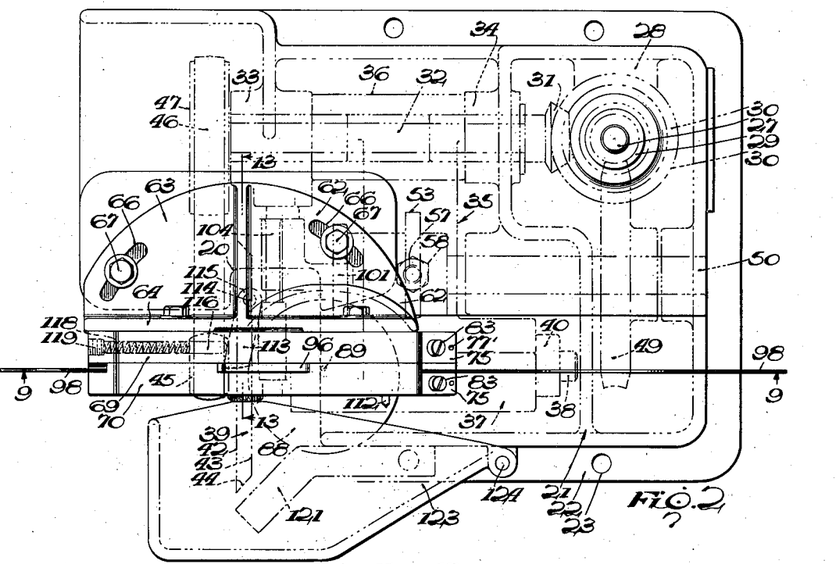
Figure 2 is a plan view of the same.
Figure 3:
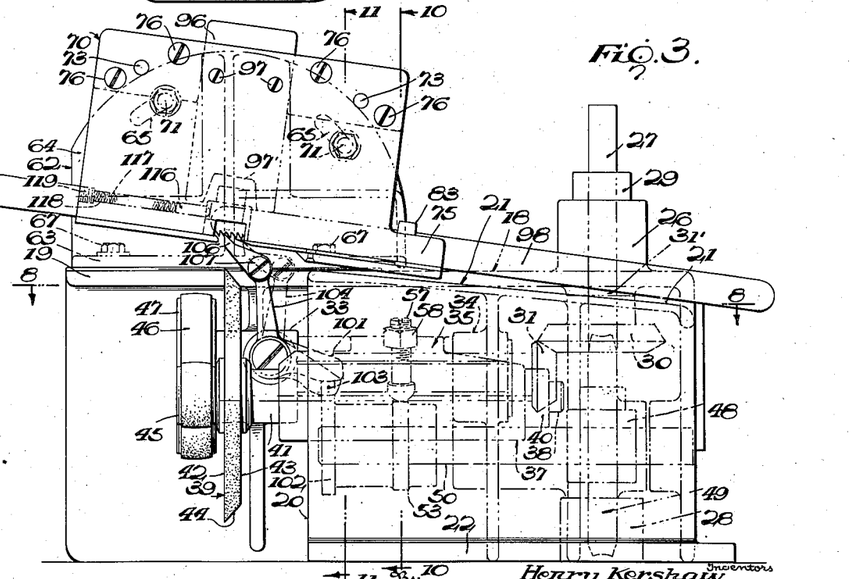
Figure 3 is a side elevation of the same.

The operation of this form of the machine is as follows:

The plate 138 may be adjusted so that the longitudinal center of the stud 142 will be in substantial alignment with the face 42 of the grinding wheel 39. The wall 159 of the tooth 160 being ground will then be radial and perpendicular, as indicated by the line 160', Figure 26. All walls 159 are radial. With the saw held in this adjustment, and when the grinding wheel 39 rises, it will grind the wall 159 radially. This wall may be ground at a right angle to the face of the saw, as is the usual practice, but could be ground at a transverse inclination, by angularly adjusting the bracket 133. The periphery 44 will grind the wall 161. After each grinding action, the pawl 106 advances the circular saw a step equal to the horizontal length of the tooth and the next tooth is ground. This operation is repeated until all teeth are ground. The plate 138 may be moved horizontally to the right with relation to the grinding wheel, and the radial lines 160' remain in the same position, since the saw has not been turned. The wall 159 of the tooth 160 to be ground is radial but inclined with respect to the perpendicular face 42, as indicated by the line 160ª, and when the grinding wheel rises and cuts the wall 159, such wall will be cut back upon the line 160ª, to provide a rake, having an angle corresponding to the angle between the lines 160ª and 160'. The grinding operations are illustrated in Figures 26 and 27. All other parts of the apparatus remain identical with those shown and described in connection with the first form of the invention, and the operation of such parts are identical with that of the first form of the invention.

It is to be understood that the forms of our invention herewith shown and described are to be taken as preferred examples of the same, and that various changes in the size, shape, and arrangement of parts, may be resorted to, without departing from the spirit of our invention and the scope of the subjoined claims.

Having thus described our invention, what we claim is:

1. A saw sharpening machine, comprising a support, a rotary grinding wheel, a saw holding device to position the saw axially of the rotary grinding wheel, a member carrying the rotary grinding wheel to shift the same into and out of engagement with the teeth of the saw, means to move the member, means to drive the rotary grinding wheel, a pawl to engage the teeth of the saw, an eccentrically pivoted disc to contact the pawl during a portion of its stroke to hold the pawl out of engagement with the saw tooth during such stroke, and means to move the pawl with relation to the disc to advance the saw.

2. A saw sharpening machine, comprising a support, upstanding connected plates arranged above the support and having a recess between them to receive the saw arranged on edge with its teeth lowermost, a rear support plate secured to the bottom of the upstanding plates, a front support plate secured to the bottom of the upstanding plates and spaced from the rear support plate to form a passage, a disc eccentrically pivotally mounted upon the rear support plate and extending to the passage, a transverse rotary grinding wheel arranged near the passage, means to raise and lower the grinding wheel, means to drive the grinding wheel, a pivoted pawl arranged beneath the disc to contact therewith for a portion of its stroke and adapted to engage the teeth of the saw, and means to move the pawl.

3. A saw sharpening machine, comprising a support, a substantially horizontal shaft mounted upon the support, means to drive the shaft, a vertically swinging carriage pivotally mounted upon the shaft, a spindle mounted upon the carriage and arranged substantially parallel with the shaft, means to drive the spindle from the shaft, a second substantially horizontal shaft mounted upon the support, means to drive the second shaft, a saw holding device mounted upon the support above the grinding wheel, means to move the carriage including a cam mounted upon the second shaft, a pawl arranged beneath the saw holding device to engage the teeth of the saw, an operating device having the pawl pivotally mounted thereon, and a cam mounted upon the second shaft to actuate the operating device.

4. A saw sharpening machine, comprising a support, a substantially vertical shaft mounted upon the support and extending above the same for insertion within the chuck of a drill, a second shaft mounted upon the support and driven from the substantially vertical shaft, a carriage pivotally mounted upon the second shaft, a rotary spindle mounted upon the carriage, a grinding wheel mounted upon the spindle, means for driving the spindle from the second shaft, a cam shaft driven from the substantially vertical shaft and mounted upon the support, means to move the carriage in one direction including a cam mounted upon the cam shaft, a pawl to engage the saw teeth and advance the saw, means to operate the pawl including a cam mounted upon the cam shaft, and a saw holding device arranged in cooperative relation to the grinding wheel.

5. A saw sharpening machine, comprising a support, a saw holding casing having a recess to receive the saw arranged on edge teeth down, said recess having a bottom provided with a passage, a holding member extending into the recess to engage the upper edge of the saw, means to mount the casing upon the support, a grinding wheel arranged beneath the casing for movement into the passage to engage the teeth, means to raise and lower the grinding wheel, means to drive the grinding wheel, and means engaging the saw teeth to advance the saw.

6. A saw sharpening machine, comprising a support, a substantially vertical shaft mounted upon the support and extending above the same for insertion within the chuck of a drill, a second shaft mounted upon the support, means to drive the second shaft from the substantially vertical shaft, a pivoted carriage arranged near the second shaft, a rotary grinding wheel carrying spindle mounted upon the carriage, means for driving the spindle from the second shaft, a cam shaft, means to drive the cam shaft from the substantially vertical shaft, means to move the carriage in one direction including a cam mounted upon the cam shaft, means to hold the saw in a position near the grinding wheel, a pawl to engage the saw teeth and advance the same, and means to operate the pawl including a cam mounted upon the cam shaft.

7. A saw sharpening machine, comprising a support, a substantially vertical drive shaft mounted upon the support, a substantially horizontal second shaft mounted upon the support, means to drive the second shaft from the substantially vertical shaft, a carriage pivotally mounted upon the second shaft to swing substantially vertically, a rotary grinding wheel carrying spindle mounted upon the carriage, means for driving the spindle from the second shaft, a substantially horizontal cam shaft arranged beneath the carriage, means to drive the cam shaft from the substantially vertical shaft, a cam to move the carriage and mounted upon the cam shaft, a saw holding device arranged near the carriage, a pawl device to engage the teeth of the saw, and a cam to operate the pawl device and mounted upon the cam shaft.

8. A saw sharpening machine, comprising a support, a substantially vertical drive shaft mounted upon the support, a substantially horizontal second shaft mounted upon the support, means to drive the second shaft from the substantially vertical shaft, a vertically movable carriage arranged near the second shaft, a rotary grinding wheel carrying spindle mounted upon the carriage, means for driving the spindle from the second shaft, a substantially horizontal cam shaft arranged beneath the carriage, means to drive the cam shaft from the substantially vertical shaft, an adjustable element mounted upon the carriage, a cam mounted upon the cam shaft to engage the element, saw holding means arranged near and above the spindle, a pawl device to engage the saw teeth, and a cam to operate the pawl device and mounted upon the cam shaft.

9. A saw sharpening machine, comprising a support to be mounted upon the table of a drill press, said support having a substantially horizontal top provided with an opening, a substantially vertical bracket arranged above the top, means to horizontally angularly adjustably mount the bracket upon the top, a guide device for receiving an elongated saw with the teeth of the saw lowermost and next to the opening, means to vertically angularly adjustably mount the guide upon the bracket, a substantially vertical shaft mounted upon the support and extending above the support for insertion within the chuck of the drill press, saw sharpening means mounted upon the support beneath the top, means to drive the saw sharpening means from the substantially vertical shaft, and saw feeding means mounted upon the support beneath the top and driven from the substantially vertical shaft.

10. A saw sharpening machine, comprising a support to be mounted upon the table of a drill press, said support having a substantially horizontal top provided with an opening, a substantially vertical shaft mounted upon the support and projecting above the support for insertion within the chuck of the drill press a guide casing arranged above the top and including a bottom provided between its ends with a passage arranged near the opening, said guide casing receiving an elongated saw on edge with its teeth arranged lowermost to contact with the bottom, a guide plate vertically adjustably mounted within the casing to engage the top edge of the saw and projecting above the casing, saw sharpening means mounted upon the support beneath the top and including an element moveable into and out of engagement with the saw teeth through the opening and passage and driven from the substantially vertical shaft, and saw feeding means mounted upon the support beneath the top and including an element to engage the teeth of the saw through the passage and driven from the substantially vertical shaft.

11. A saw sharpening machine, comprising a casing having a bottom provided with an opening, the casing receiving an elongated saw arranged on edge with its teeth in the lowermost position, an eccentrically pivoted disc disposed adjacent to the bottom and opening, a pawl arranged beneath the disc and carried by the operating means, means to move the pawl into engagement with the disc and from such engagement into the opening to engage the saw teeth, and sharpening means moveable into engagement with the saw teeth through the opening.

12. A saw sharpening machine, comprising a guide device for receiving a saw and having an opening adjacent to the teeth of the saw, an eccentrically pivoted disc disposed adjacent to the opening, a pawl arranged upon one side of the disc and carried by the operating means, means to move the pawl into engagement with the disc and from such engagement into the opening to engage the saw teeth, sharpening means moveable into the opening engagement with the saw teeth through the opening, and means to hold the saw against improper movement during the sharpening operation.

13. A saw sharpening machine comprising a support, having an opening, a saw guide device for receiving an elongated saw, means to angularly adjustably mount the saw guide upon the support, an arm carried by the saw guide and extending through the opening in the support, a clamp arm extending through the opening in the support and engaging the saw within the saw guide, means to pivotally mount the clamp arm upon said arm, a spring to move the pivoted clamp arm in one direction, means to engage the saw and feed the same, and saw sharpening means movable into and out of engagement with the saw teeth.

14. A saw sharpening machine comprising a support, a rotary grinder carrying spindle arranged near the support and extending longitudinally of the support, means to drive the spindle and move the same toward and from the support, a plate mounted upon the support, adjustable means connecting the plate with the support so that the plate may be shifted longitudinally of the spindle, and means to mount a circular saw upon the plate so that its axis of rotation is disposed transversely of the spindle, and means to turn the saw.

15. A saw sharpening machine comprising a support, a rotary grinder carrying spindle arranged near the support and extending longitudinally of the support, means to drive the spindle and move the same toward and from the support, a plate mounted upon the support and having an opening transversely of the spindle, adjustable means connecting the plate with the support so that the plate may be shifted longitudinally of the spindle, a stud adjustably mounted within the opening of the plate, an adapter mounted upon the stud, a nut carried by the stud and engaging the adapter so that the stud may be clamped to the plate, the adapter receiving thereon a circular saw and holding the saw so that its axis of rotation is transversely of the spindle, and resilient means carried by the stud and engaging the circular saw.

16. A saw sharpening machine, comprising a device for receiving and holding a saw, sharpening means movable into and out of engagement with the saw teeth, a pawl to engage the saw teeth, an eccentrically pivoted disc arranged to cover the pawl and have its side face contact with the free end of the pawl, and means separate from the disc to shift the pawl generally radially with respect to the disc so that the free end of the pawl will clear the disc and engage with the tooth of the saw.

17. A saw sharpening machine, comprising a support having an opening in its top, a saw holding device mounted upon the support above the top of the support for holding a saw inverted with its teeth next to the opening, a swinging carriage mounted upon the support and arranged beneath the top and the saw, a rotary grinder mounted upon the swinging carriage and arranged beneath the top and saw for movement into the opening of the top, a drive shaft mounted upon the support beneath the swinging carriage, a cam mounted upon the drive shaft to raise the carriage, a pivoted lever mounted upon the support beneath the top, a pawl carried by the pivoted lever to enter the opening in the top and engage the tooth of the saw, a cam mounted upon the drive shaft and engaging the pivoted lever, and means to drive the rotary grinder.

HENRY KERSHAW.
ALBERT F. PITYO.
HARRY BUTTERFIELD.

REFERENCES CITED

The following references are of record in the file of this patent:

UNITED STATES PATENTS

| Number | Name | Date |
|---|---|---|
| 72,083 | Rich | Dec. 10, 1867 |
| 90,010 | Markland | May 11, 1869 |
| 194,705 | Medearis | Aug. 28, 1877 |
| 454,011 | Edge | June 9, 1891 |
| 504,404 | Rhodes | Sept. 5, 1893 |
| 889,180 | Daniels | May 26, 1908 |
| 1,193,643 | Wardwell | Aug. 8, 1916 |
| 1,452,351 | Armstrong et al. | Apr. 17, 1923 |
| 1,486,440 | Kramer | Mar. 11, 1924 |
| 1,599,674 | Nosan | Sept. 14, 1926 |
| 1,628,975 | Hawkins | May 17, 1927 |
| 1,659,964 | Schultz | Feb. 21, 1928 |
| 1,666,087 | Collier | Apr. 17, 1928 |
| 1,763,065 | Pribnow | June 10, 1930 |
| 1,805,831 | Mathieu | May 19, 1931 |
| 1,859,363 | Hart | May 24, 1932 |
| 1,909,832 | Jirka | May 16, 1933 |
| 2,146,686 | Roxll | Feb. 7, 1939 |
| 2,245,982 | Knowles | June 17, 1941 |
| 2,267,553 | Dale | Dec. 23, 1941 |
| 2,334,136 | Underwood | Nov. 9, 1943 |
| 2,343,171 | Collier | Feb. 29, 1944 |
| 2,356,448 | Daggett | Aug. 22, 1944 |
| 2,425,876 | Hively | Aug. 19, 1947 |

FOREIGN PATENTS

| Number | Country | Date |
|---|---|---|
| 341,628 | Great Britain | Jan. 22, 1931 |